United States Patent [19]
Sundberg

[11] Patent Number: 6,112,338
[45] Date of Patent: Sep. 5, 2000

[54] MIXING DRUM AND COMPOSTING TOILET

[76] Inventor: Henric Sundberg, 5035 North Service Road, Unit C9, Burlington, Ontario, Canada, L7L 5V2

[21] Appl. No.: 09/353,622

[22] Filed: Jul. 15, 1999

[51] Int. Cl.[7] .................................................. A47K 11/02
[52] U.S. Cl. ..................... 4/449; 4/DIG. 12; 435/290.3; 366/186
[58] Field of Search .......................... 4/449, 111.1, 111.5, 4/111.6, DIG. 12, DIG. 19; 435/290.3, 290.4; 366/186, 50, 224

[56] References Cited

U.S. PATENT DOCUMENTS

| | | |
|---|---|---|
| 581,182 | 4/1897 | Stadtmuller . |
| 3,882,552 | 5/1975 | Turner . |
| 4,499,614 | 2/1985 | Yeagley . |
| 4,627,116 | 12/1986 | Shimizu . |
| 4,633,535 | 1/1987 | Louvo . |
| 4,664,527 | 5/1987 | Schuler . |
| 5,292,637 | 3/1994 | Böhnensieker . |
| 5,433,524 | 7/1995 | Wüster . |
| 5,501,978 | 3/1996 | Sundberg . |
| 5,766,935 | 6/1998 | Seagren . |

FOREIGN PATENT DOCUMENTS

| | | |
|---|---|---|
| 000536767 A1 | 4/1993 | European Pat. Off. . |
| 404362080 | 12/1992 | Japan . |
| 81/03487 | 12/1981 | WIPO . |

*Primary Examiner*—Henry J. Recla
*Assistant Examiner*—Tuan Nguyen
*Attorney, Agent, or Firm*—Ingrid E. Schmidt

[57] ABSTRACT

A mixing drum for a composting toilet has an auger for transporting mixed material from a back end of the mixing drum to the front end of the mixing drum in order to increase the residence time of material mixed in the drum. The auger is enclosed in an auger tube and the auger rotates about an axis which is radially spaced from the longitudinal axis for the mixing drum, about which the mixing drum itself rotates.

9 Claims, 6 Drawing Sheets

MIXING DRUM AND COMPOSTING TOILET

FIELD OF THE INVENTION

This invention relates to a composting toilet and, more particularly, to a mixing drum for mixing waste received into the toilet. The mixing drum also has attributes which may be desirable for mixing materials other than human waste intended to be decomposed.

BACKGROUND OF THE INVENTION

In a composting toilet, human waste is decomposed by mixing the waste with peat moss, aerating the mixture, and separating the fluids from the solids. One of the factors which will greatly enhance decomposition is simply time. The more the waste is exposed to air and allowed to drain, the greater the decomposition. It is therefore desirable to increase the path of travel inside the mixing drum to thereby increase the residence time of the waste inside the drum. It is also important for the composting toilet to provide means to remove the oldest, most decomposed material from the unit without allowing fresh material to be removed prematurely.

In U.S. Pat. No. 4,664,527, a rotary type tumbler is described which includes an axially positioned auger that conveys mixed livestock feed to a discharge opening at the same end of the tumbler as where the feed enters the tumbler. This arrangement ensures that feed must travel through the length of the tumbler at least twice before being discharged. However, the feed which is admitted to the auger will usually originate from the top of a mound of material collected inside the tumbler. Older material which is adjacent to the tumbler wall does not get delivered until the tumbler is emptied.

One of the problems described in the patent is the difficulty encountered in carrying the mixed feed from the lowermost part of the tumbler after it has been mixed, to the axially positioned auger so that it can be conveyed to the discharge opening. This problem is addressed in the patented invention by providing scoop blades at the rearward end of the tumbler for carrying the mixed feed to an inlet opening for the auger.

The arrangement of an auger positioned axially in a tumbler such as that shown in U.S. Pat. No. 4,664,527 is unsuitable for use in a composting toilet because the mixed materials are discharged from the auger into a chute which is positioned to deliver the mixed materials outside the tumbler.

In a composting toilet, it is preferable to discharge the decomposed waste into a receptacle which is enclosed by a housing for the toilet. In this way, the decomposed waste is hidden from view and is allowed to decompose still further. For this reason, the receptacle is often called a "finishing drawer".

To comply with health standards and regulations, in a composting toilet, a minimum clearance between the toilet seat and the waste level inside the toilet must be provided. With an axially positioned auger, the path of material discharged into a composting toilet could include the auger and the toilet seat would then have to be very high off the ground to provide the necessary clearance. This is clearly impractical. Further, an axially positioned auger occupies space which could otherwise accommodate waste and therefore reduces the effective capacity of the tumbler.

Thus, while the concept of introducing an auger into a tumbler to increase residence time is known, it is not apparent how to apply this advantageously to maximize decomposition of the finished product in a composting toilet.

In U.S. Pat. No. 4,633,535, an auger is provided in a composting toilet but only a small portion of the decomposing waste material is returned to the collecting bowl beneath the seat and this is done in order to introduce microbes for accelerating decomposition. Most of the decomposed material exits at an end of the unit which is remote from the collecting bowl and the waste traverses the length of the unit only once. There is no teaching of using an auger to increase the residence time of waste in the toilet so as to maximize decomposition in the product discharged from the mixer.

An object of this invention is to provide an auger into a mixing drum for a composting toilet in order to increase the residence time of the material being mixed and to maximize decomposition.

SUMMARY OF THE INVENTION

In accordance with the invention, a mixing drum is provided with an auger to transport mixed materials from a back end of the drum to the front end of the drum, the auger being disposed for rotation on an axis which is radially spaced from the longitudinal rotation axis of the mixing drum. The auger is enclosed in a tube disposed inside the mixing drum and has an inlet opening at a back end of the tube and an outlet opening at a front end of the tube. This arrangement permits the auger to easily collect material from the lowermost part of the drum, after it has been mixed, for conveyance to the discharge opening without requiring any scoop blades and the like. The mixed material is also discharged without requiring a chute.

The mixing drum is rotated by first drive means having a rotatable shaft with a first pinion wheel at one end and rotating means at another end, a first sprocket wheel being fixed to the drum and engaged by the first pinion wheel.

The auger is rotated by second drive means having a second sprocket wheel which is fixed relative to the mixing drum, and a second pinion wheel connected to the auger and driven to rotate on its own axis by the second sprocket wheel during each revolution of the mixing drum.

In a preferred embodiment of the invention, the first sprocket wheel is located at one end of the mixing drum and comprises a toothed track on an outer perimeter of the side wall for the mixing drum. The second sprocket wheel is smaller in diameter and is fixed to an end wall of a housing for the mixing drum adjacent to the first sprocket wheel.

BRIEF DESCRIPTION OF THE DRAWINGS

In order to better understand the invention, a preferred embodiment is described below, with reference to the accompanying drawings, in which.

DESCRIPTION OF PREFERRED EMBODIMENT

Figures 1, 2:
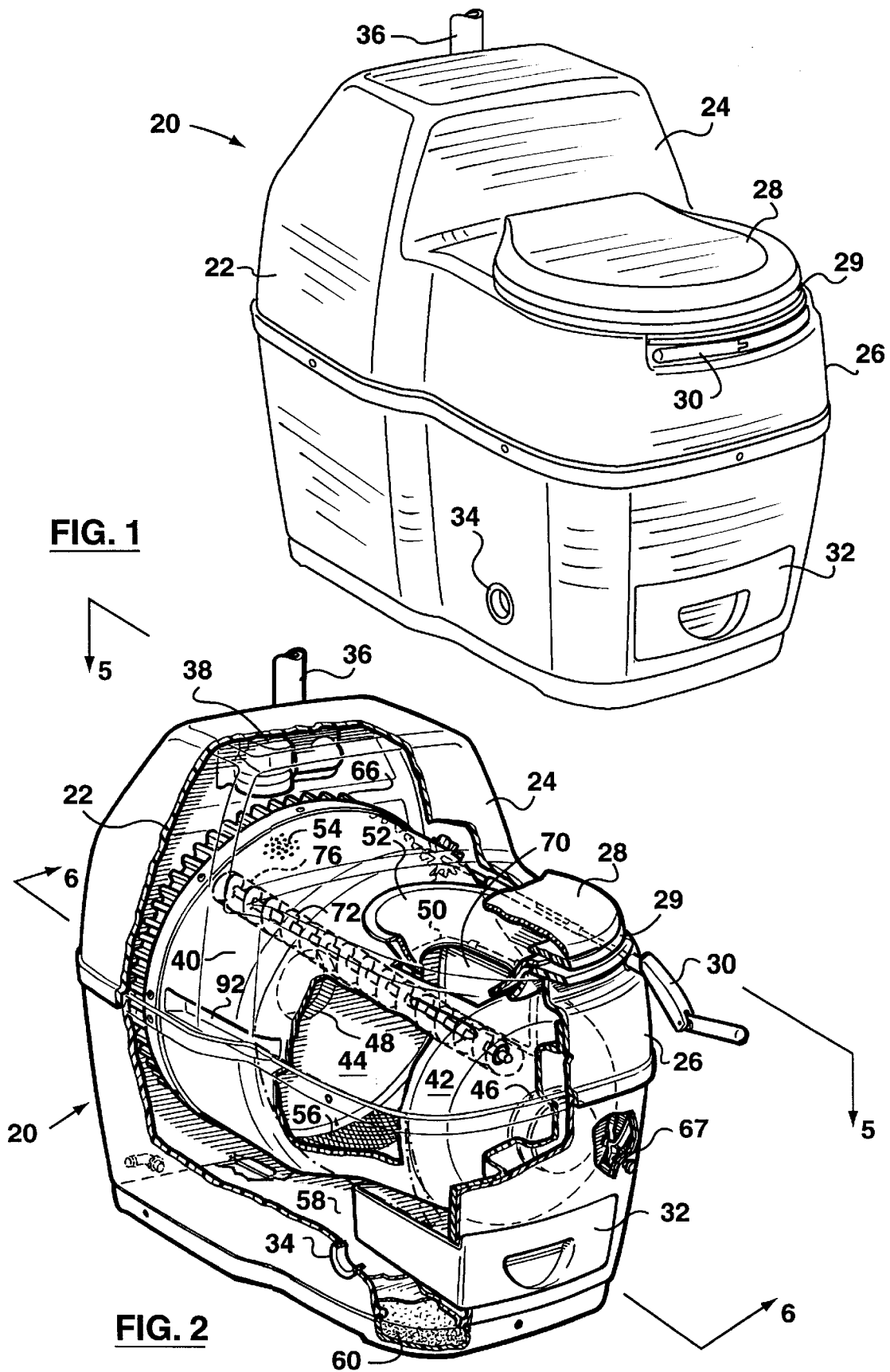
FIG. 1 is a perspective view of a composting toilet made in accordance with the invention and showing the exterior thereof.
FIG. 2 is a similar view to FIG. 1 with a housing partly broken away to reveal the interior components.

A composting toilet made in accordance with the invention is generally indicated in FIG. 1 by reference numeral 20. The exterior of the toilet is similar to applicant's prior art toilets which are the subject of design Pat. No. Des. 354340. The exterior shown in FIG. 1 comprises a housing 22 comprised of two portions which mate horizontally approximately mid-way along the height of the toilet. It will be noted that the back end 24 of the housing is somewhat wider and taller than the front end 26. A seat cover 28 is disposed at the front end 26 over a seat 29 and is hinged to the housing 22 so as to selectively open and close access to the interior of the composting toilet 20.

Recessed into the front end 26 of the housing 22, there is a handle 30 which may be retrieved for rotating a composting drum as will be described in further detail below. A finishing drawer 32 is disposed at the front end 26 of the housing 22 and is slidably received in the housing adjacent a bottom surface thereof. Decomposed waste is discharged into the finishing drawer 32 and is periodically removed, as the need arises.

FIG. 1 also shows a drain hole 34 in a side wall for the housing 22 adjacent a bottom surface thereof and which may be used to drain liquids from the composting toilet 20. However, in normal use, liquids will be removed from the composting toilet through evaporation and vented from the composting toilet through a vent pipe 36. A motorized fan 38 (shown in FIG. 2) disposed inside the back end 24 of the housing 22 adjacent to the vent pipe 36 creates a draft inside the housing to aid in evaporation of liquids and venting fumes.

Referring now more particularly to FIG. 2, the composting toilet 20 has a mixing drum 40 disposed horizontally inside the housing 22 for rotation about a longitudinal axis for the drum which extends horizontally through the housing 22. The mixing drum 40 has a front end wall 42 and a back end wall 44 each carrying respective bosses 46, 48 which extend outwardly from the mixing drum and are rotatably supported in cooperating recesses formed in the housing 22. The mixing drum 40 has a so-called variable diameter: the front end of the mixing drum having a smaller diameter than the back end. This feature of the mixing drum is advantageous in controlling movement of waste inside the drum and conveniently allows the seat at the front end of the drum to be at a lower, more convenient, height. These features and other aspects of the composting variable diameter drum are fully described in U.S. Pat. No. 5,501,978 and U.S. Pat. No. 5,345,620 to Sundberg. The mixing drum 40 has a drum inlet opening 50 formed in a side wall at a front end of the mixing drum which is associated with a bowl 52 disposed beneath the toilet seat 29 and seat cover 28. In use, the drum inlet opening 50 will receive waste and additional materials used for decomposition of the waste, such as peat moss.

It will be seen that the mixing drum 40 has a series of vent apertures 54 formed in the side wall at a back end of the mixing drum and disposed on the same side as the drum inlet opening 50 so that, in normal use, the drum inlet opening 50 and the vent apertures 54 are at the top of the composting toilet. A liquid drain aperture covered by a mesh 56 is formed in a side wall of the mixing drum at the back end thereof opposite from the vent apertures 54. Liquid is discharged from the mixing drum 40 through the mesh 56 and collected in a tray 58 where it will normally evaporate, as described above. If excess liquid accumulates inside the tray, this may be drained through the drain hole 34. It will be seen from FIG. 2 that the bottom of the housing 22 is insulated with insulation 60 in order to facilitate evaporation of liquid from the tray 58.

Rotation of the mixing drum 40 will now be described with particular reference to FIG. 3. It will be seen that the handle 30 is operatively connected to a drive shaft 62 at one end of the shaft and that the shaft 62 carries a first pinion wheel 64 at the other end. The pinion wheel 64 engages a first sprocket wheel 66 which comprises a toothed track on the outer perimeter of the side wall for the mixing drum 40 at the back end of the mixing drum. Rotation of the handle 30 turns the pinion wheel 64 and causes the drum 40 to rotate.

Rotation of the handle 30 in the opposite direction is blocked by an interference mechanism 67 shown in FIG. 2, comprising a flexible pawl mounted to the interior of the housing 22 which is retractable away from a wedge mounted to the drum wall.

The drum inlet opening 50 at the front end of the mixing drum 40 is normally open. A lid 70 is hinged to the side wall of the mixing drum adjacent to the drum inlet opening 50 and hangs inside the mixing drum 40. During rotation of the mixing drum 40, in the direction indicated by arrows 68 in FIGS. 10a to 10e, the lid 70 is caused to fall against the side wall of the drum so as to close the drum inlet opening 50 thereby preventing waste material from being discharged through the opening 50 during said rotation. However, if the drum is rotated in the opposite direction from that indicated by arrows 68, the lid 70 will remain open and the contents of the mixing drum will be discharged from the front end thereof into the finishing drawer 32. This operation is only used to empty the mixing drum for cleaning, maintenance, or transport to another site and would not be performed in regular day-to-day use of the composting toilet in order to take advantage of the auger assembly forming part of the invention.

Figure 3:
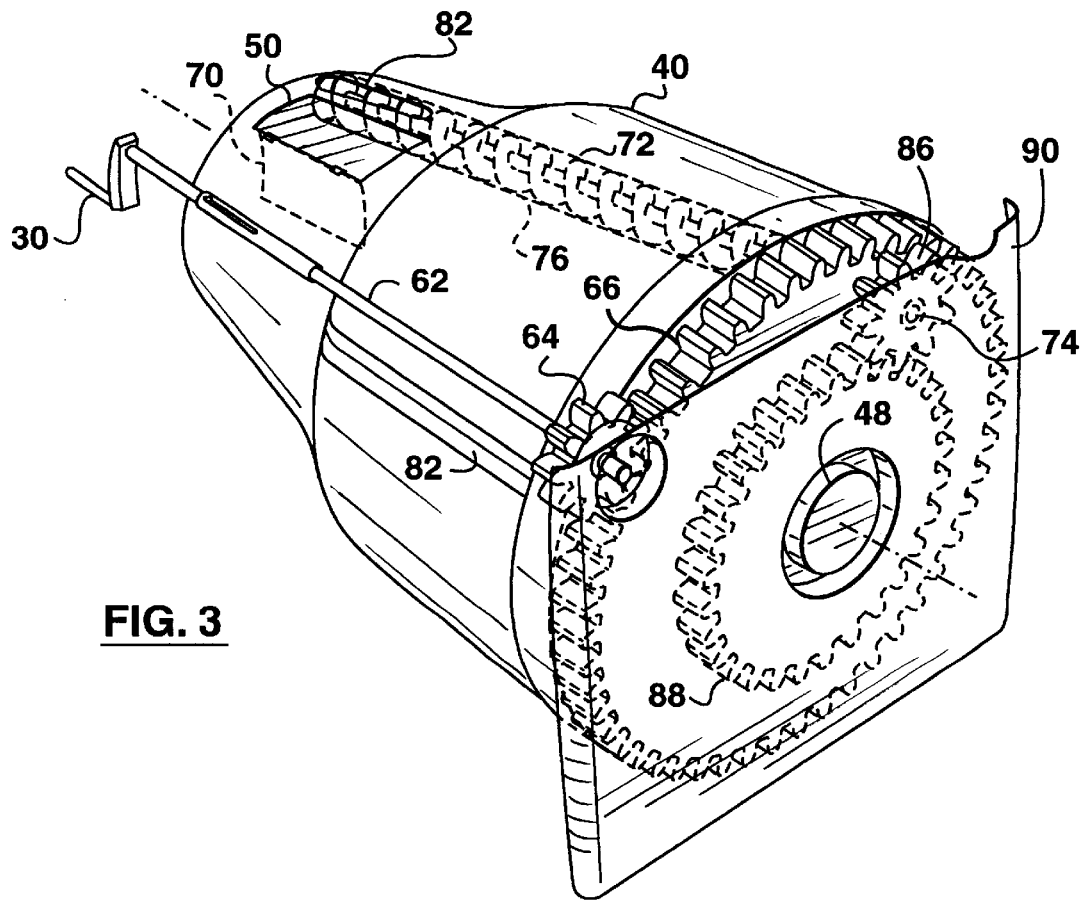
FIG. 3 is a perspective view of a mixing drum forming part of the composting toilet.
Figure 5:
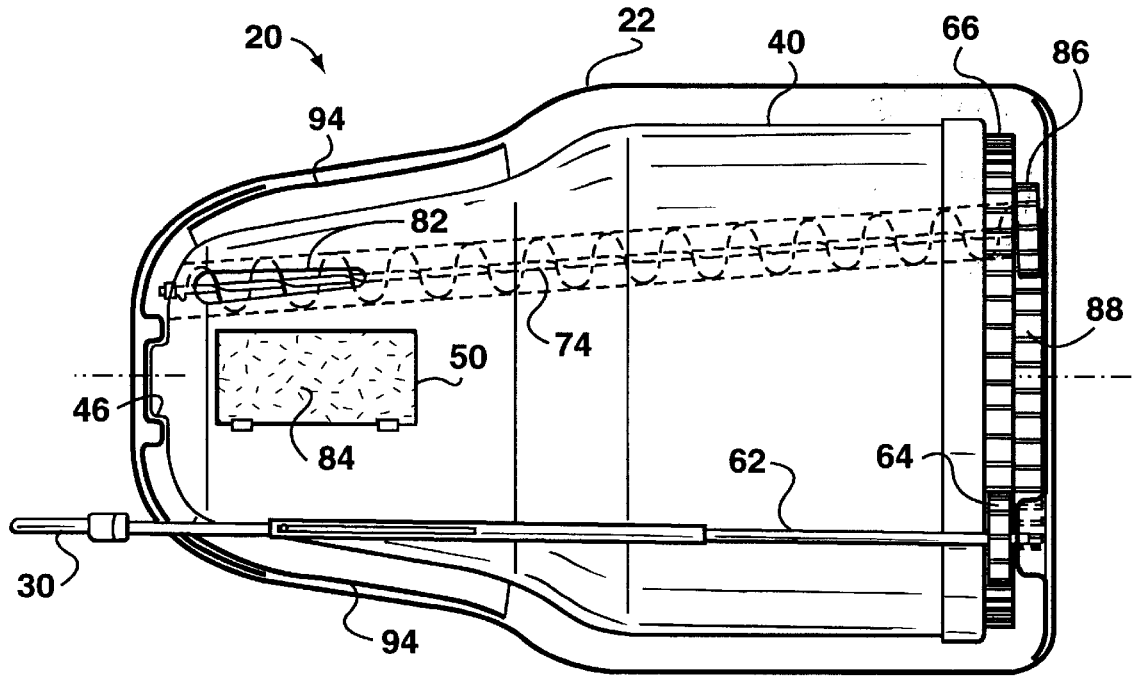
FIG. 5 is a cross-sectional view through the housing of the toilet drawn on line 5—5 of FIG. 2 and showing a top plan view of the mixing drum.

In accordance with the invention, an auger is provided inside the mixing drum and is generally indicated in FIG. 3 by reference numeral 72. The auger 72 comprises a helical blade fixed to a shaft which extends from the front end of the mixing drum 40 through the back end of the mixing drum, the shaft itself being indicated by reference numeral 74. The auger 72 is enclosed in an auger tube 76 between a tube inlet opening 78 at a back end of the auger tube 76 and a tube outlet opening 80 at a front end of the auger tube 76. The tube inlet opening 78 and tube outlet opening 80 are schematically illustrated in the cross-sectional views of FIGS. 9 and 10, respectively. The tube outlet opening 80 at the front end of the auger tube 76 is in fluid communication with a drum outlet opening 82 (FIG. 5) and both have a tapered shape adapted to spread the decomposed waste in the finishing drawer 32.

Figure 6:
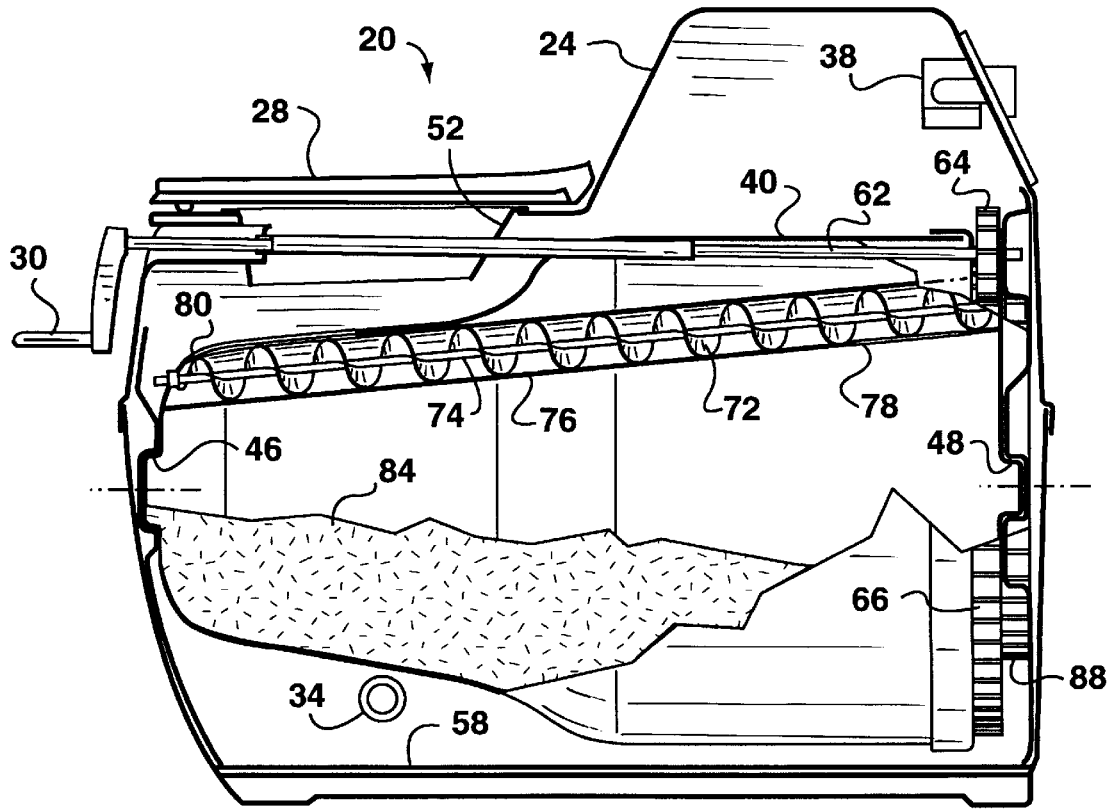
FIG. 6 is a cross-sectional view through the housing of the composting toilet drawn on line 6—6 of FIG. 2 showing a side elevation view of the mixing drum which is partly broken away to reveal the interior contents.
Figure 7:
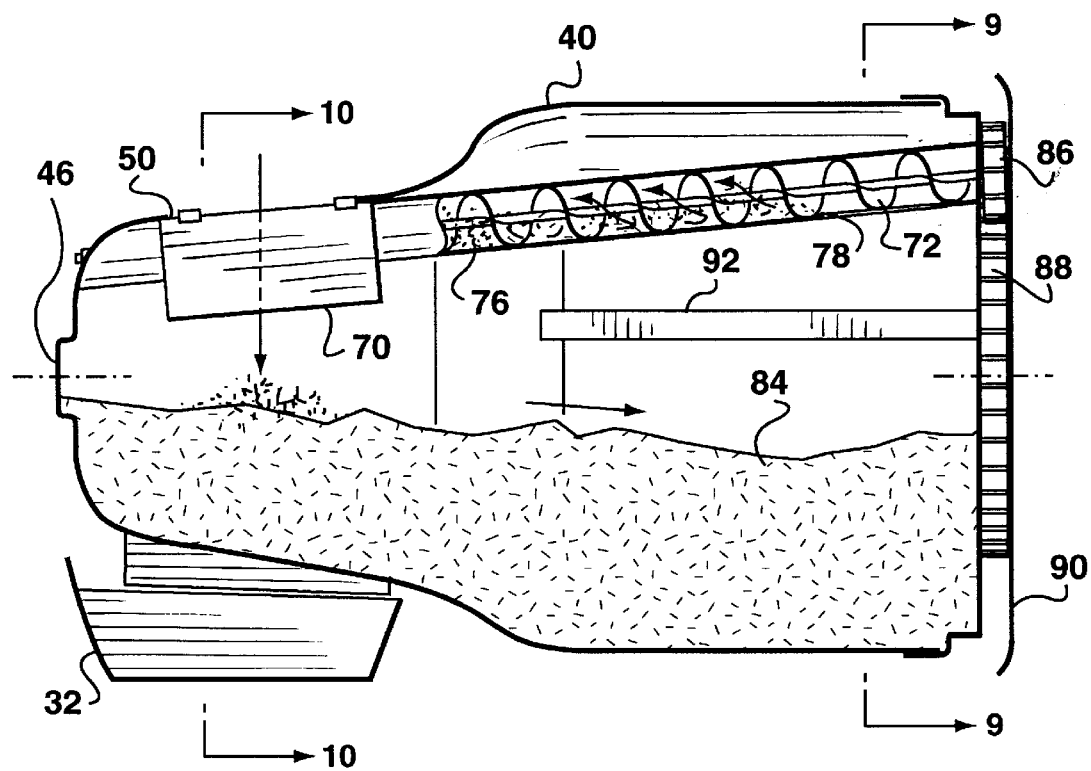
FIG. 7 is a cross-sectional view through the mixing drum drawn in association with a finishing drawer.
Figure 8:
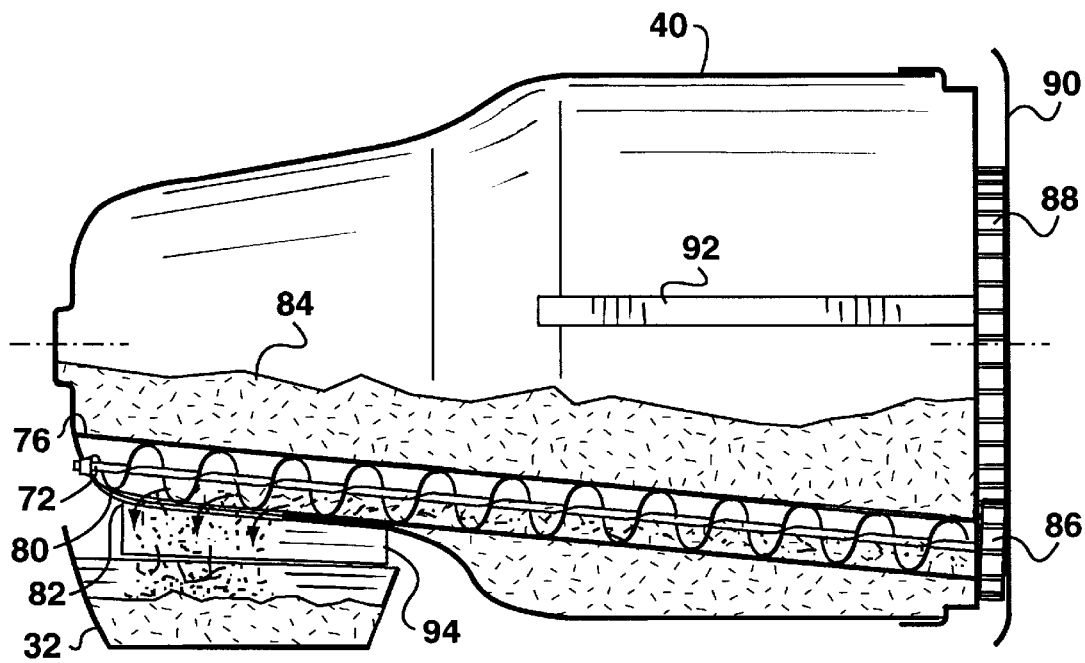
FIG. 8 is a similar view to FIG. 7 with the drum rotated 180°.
Figure 9A:
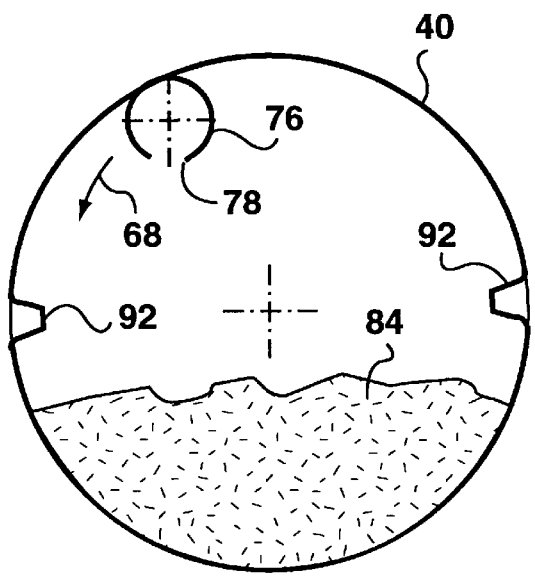
FIGS. 9a–9d are cross-sectional views drawn on line 9—9 of FIG. 7 showing the back end of the mixing drum various radial positions.
Figure 9B:
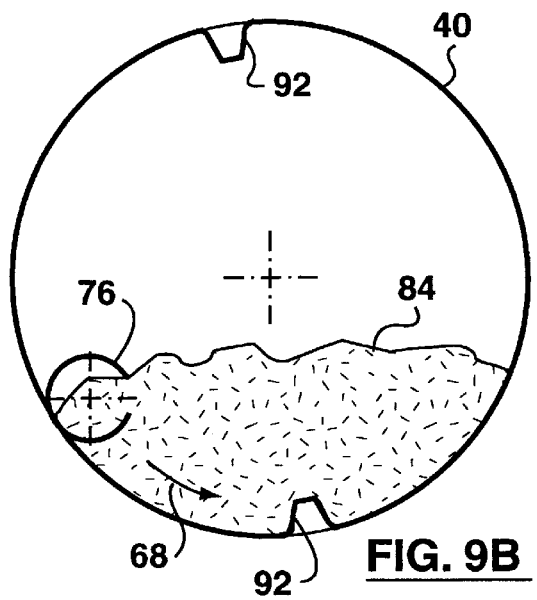
Figure 9C:
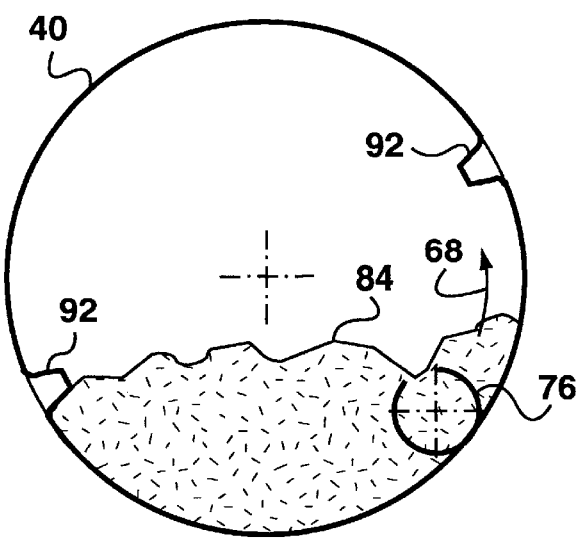
Figure 9D:
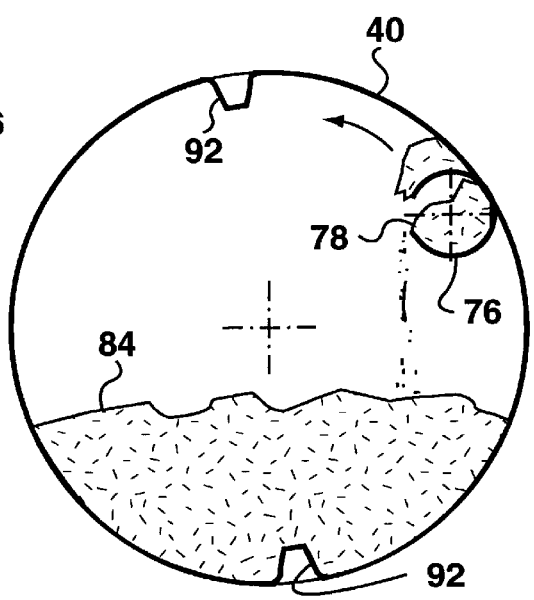
Figure 10A:
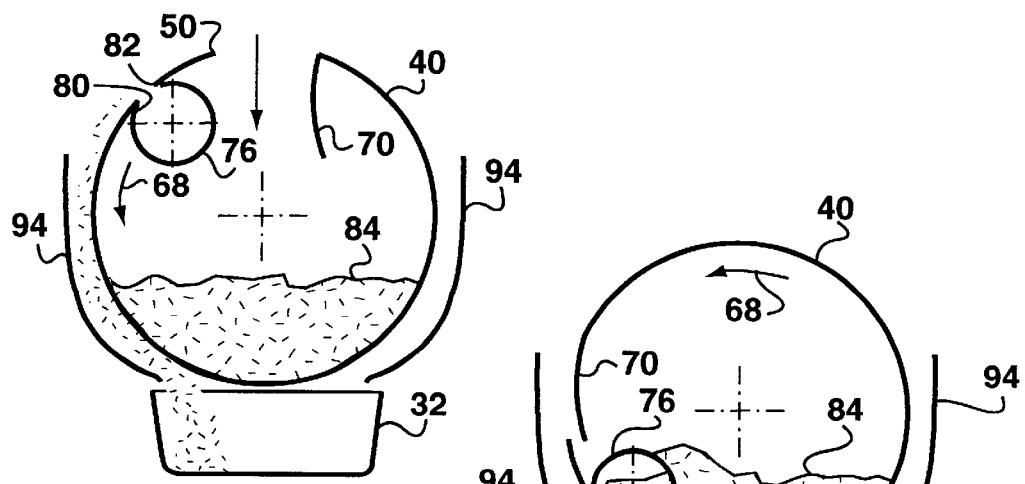
FIGS. 10a–10e are cross-sectional views drawn on line 10—10 of FIG. 7 showing the front end of the mixing drum in various radial positions.
Figure 10B:
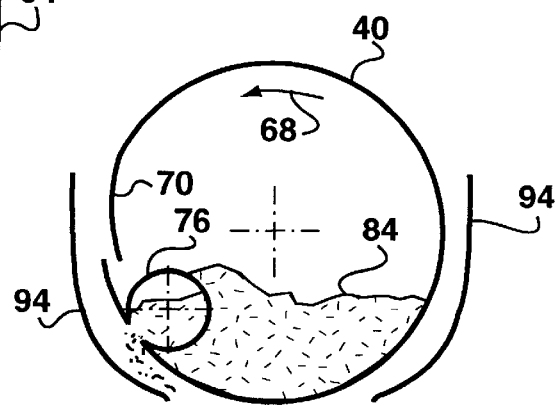
Figure 10C:
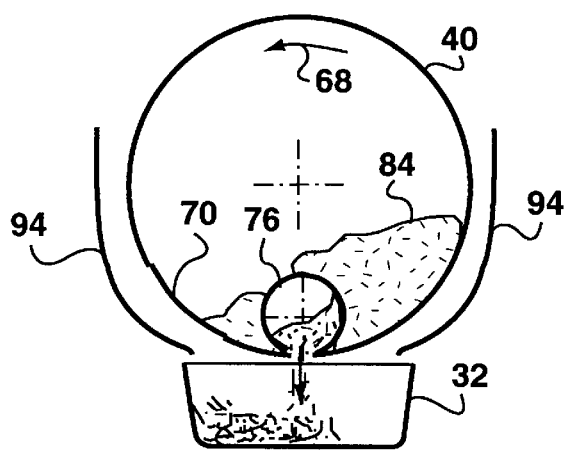
Figure 10D:
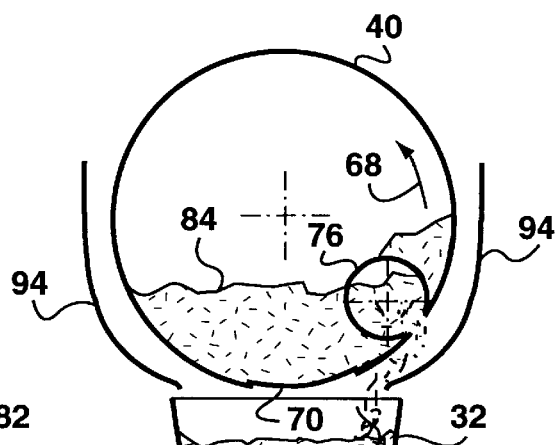
Figure 10E:
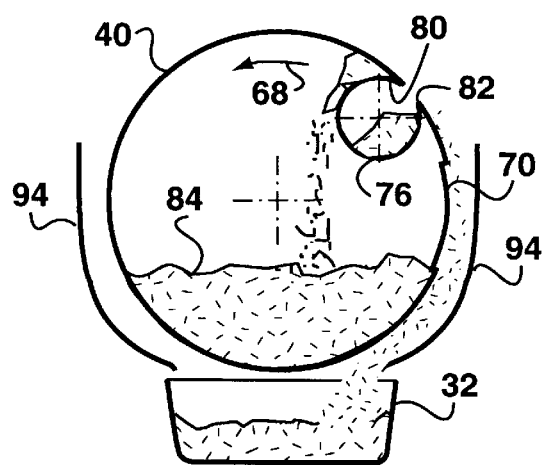

The auger tube 76, as shown in FIG. 6, is disposed inside the mixing drum 40 adjacent to the drum wall with the tube inlet opening 78 oriented inwardly to be adapted to scoop waste 84, as indicated in FIG. 9b, from the back end of the mixing drum 40 adjacent to the interior wall and the tube outlet opening 80 is oriented outwardly to be adapted to discharge decomposing waste 84 through the drum outlet opening 82, as indicated in FIG. 10. The auger tube 76 is radially spaced from the longitudinal axis for the mixing drum 40 and positioned so that the tube outlet opening 80 and the associated drum outlet opening 82 are both spaced from the drum inlet opening 50, as will more clearly be seen in FIG. 5. In this way, any waste received into the bowl 52 into the composting drum cannot inadvertently fall into the auger tube 76.

Figure 4:
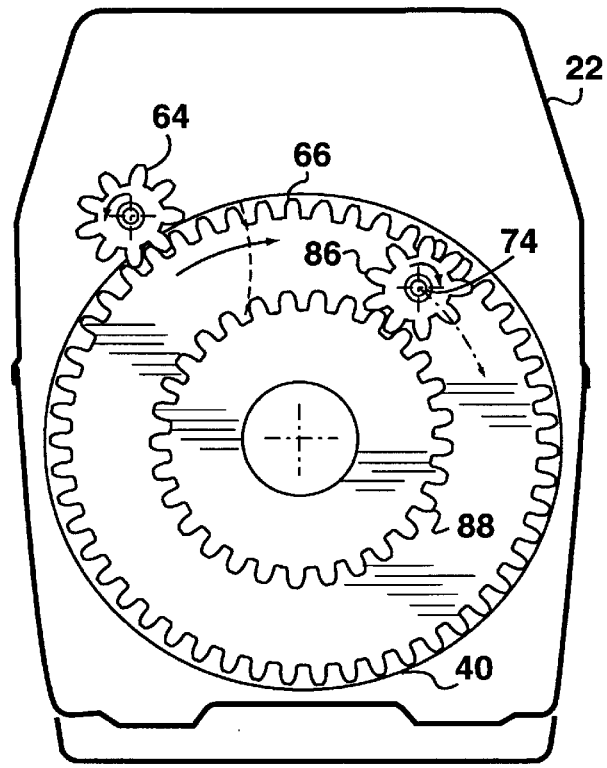
FIG. 4 is an end elevation from the back end of the mixing drum (drawn to the right of FIG. 3)

The auger 72 itself rotates about its longitudinal axis by means of a second pinion wheel 86 fixed to the outer end of the shaft 74 and disposed on the exterior end wall of the mixing drum 40 at the back end adjacent to the first sprocket wheel 66 (see FIGS. 3 and 4). The second pinion wheel 86 is engaged by a second sprocket wheel 88 which is fixed to an end wall 90 forming part of the housing 22 and adjacent to the first sprocket wheel 66. Each revolution of the mixing drum 40 brought about by turning the handle 30 causes the second pinion wheel 86 to revolve around the second sprocket wheel 88 and to rotate on its own axis as it engages the sprocket wheel, thereby rotating the auger 72. In so doing, any waste material collected by the auger 72 through the tube inlet opening 78 as shown in FIGS. 9a–9d will be moved forwardly through the auger tube 76 towards the tube outlet opening 80 where it is discharged through the drum outlet opening 82 into the finishing drawer 32 as shown in FIGS. 10a through 10e. Rotation of the auger 72 through the waste collected in the auger tube 76 breaks up the waste so that blocking of the auger tube is less likely to happen and continuously moves material through the auger tube 76 so that a small portion of decomposed material is always being discharged.

It will be appreciated that material entering the mixing drum 40 must therefore travel from the front end of the drum to the back end of the drum and be scooped by the auger tube 76 wherefrom it is returned to the front of the drum before being discharged. The material which exits the mixing drum 40 into the finishing drawer 32 has thus traversed the length of the mixing drum at least twice and this guarantees a minimum residence time in the mixing drum which is beneficial to decomposition. It will also be appreciated that waste material received at the front end of the drum finds its way to the back end of the mixing drum 40 only upon rotation of the mixing drum and that the user will periodically rotate the handle 30 in order to cause the material to move from the front to the back. Only a small amount of material is scooped by the auger tube during each rotation from the waste collected at the back of the mixing drum 40 as the tube progresses through a mound of waste collected at the back end. This further ensures that the residence time of waste material which is admitted into the auger tube 76 has increased. To assist in mixing the waste material, the mixing drum 40 has paddles 92 formed on the interior side walls which extend along a portion of the length of the mixing drum in the large diameter portion at the rear of the drum. In the embodiment illustrated, only two such paddles 92 or ribs are shown but, of course, the number of paddles may be increased, as necessary. It will be appreciated that the auger tube 76 itself will contribute to mixing the contents of the mixing drum as the auger tube travels through the waste material.

Baffles 94 (drawn in FIGS. 10a–10e) are provided on opposite sides of the mixing drum 40 at the front narrow end thereof in order to guide material which leaves the auger tube outlet opening 80 and drum outlet opening 82 into the finishing drawer 32. Such baffles 94 may possibly be omitted if a larger capacity finishing drawer is provided to receive the material discharged from the auger tube.

It will be appreciated that several variations may be made to the above-described embodiment of the invention without departure from the scope of the appended claims. In particular, it will be appreciated that the drive means for rotating the mixing drum 40 could be automated and comprise, for example, a motor to replace the handle 30. It will also be appreciated that the auger 72 may be introduced into a mixing drum used to mix other materials than decomposing waste and that, in the case of waste materials, these could be purely vegetable matter, as in the case of a composter for kitchen or garden waste, and that the variable diameter configuration of the mixing drum 40 may be omitted in favour of a constant diameter mixing drum. Other embodiments are also contemplated in which the auger is also driven by motorized means.

I claim:

1. A mixing drum having
   a drum inlet opening at a front end of the mixing drum and adapted to receive raw materials into the mixing drum;
   a drum outlet opening at a front end of the mixing drum and adapted to discharge mixed materials from the mixing drum, the drum outlet opening being spaced from said drum inlet opening;
   first drive means for rotating the mixing drum about a longitudinal axis thereof;
   an auger for transporting mixed material from a back end of the mixing drum to the front end of the mixing drum, the auger being enclosed in an auger tube between a tube inlet opening at a back end of the auger tube and a tube outlet opening at a front end of the auger tube in fluid communication with said drum outlet opening, the auger tube being disposed inside the mixing drum with the auger extending between said back end of the mixing drum and the front end of the mixing drum; and
   second drive means for rotating the auger about a longitudinal axis thereof, the auger rotating about an axis which is radially spaced from the longitudinal axis for the mixing drum.

2. A mixing drum having
   a drum inlet opening at a front end of the nixing drum and adapted to receive raw materials into the mixing drum;
   a drum outlet opening at a front end of the mixing drum and adapted to discharge mixed materials from the mixing drum, the drum outlet opening being spaced from said drum inlet opening;
   first drive means for rotating the mixing drum about a longitudinal axis thereof, the first drive means having a rotatable drive shaft with a first pinion wheel at one end thereof and rotating means at another end thereof, and a first sprocket wheel fixed to said mixing drum and engaged by said first pinion wheel;
   an auger for transporting mixed material from a back end of the mixing drum to the front end of the mixing drum, the auger being enclosed in an auger tube between a tube inlet opening at a back end of the auger tuber and a tube outlet opening at a front end of the anger tuber in fluid communication with said drum outlet opening, the auger tube being disposed inside the mixing drum with the auger extending between said back end of the drum and the front end of the mixing drum; and second drive means for rotating the auger about a longitudinal axis thereof, the second drive means having a second sprocket wheel fixed to the housing for the mixing drum and engaging a second pinion wheel, the second pinion wheel being connected to said auger and driven by said second sprocket wheel during a revolution of the mixing drum, the auger rotating about an axis which is radially spaced from the longitudinal axis for the mixing drum.

3. A mixing drum according to claim 2 in which the first sprocket wheel comprises a toothed track on an outer perimeter of the side wall for the mixing drum and the second sprocket wheel is fixed to an end wall of a housing for the mixing drum.

4. A mixing drum according to claim 3 in which the first sprocket wheel is located at one end of the mixing drum adjacent said end wall.

5. A mixing drum according to claim 2 in which the auger tube is disposed inside the mixing drum adjacent to the drum wall with the tube inlet opening oriented inwardly to be adapted to scoop waste from the back end of the mixing drum and the tube outlet opening oriented outwardly to be adapted to discharge mixed materials through the drum outlet opening.

6. A composting toilet having a housing defining an opening for a toilet seat through which waste is discharged into a mixing drum rotatably mounted inside the housing, the mixing drum having a drum inlet opening formed in a side wall at a front end of the mixing drum and adapted to receive waste materials into the mixing drum;

a drum outlet opening formed in a side wall at a front end of the mixing drum and adapted to discharge decomposed waste from the mixing drum, the drum outlet opening being spaced from said drum inlet opening;

first drive means for rotating the mixing drum about a longitudinal axis thereof, the first drive means having a rotatable drive shaft with a first pinion wheel at one end thereof and rotating means at another end thereof, and a first sprocket wheel fixed to said mixing drum and engaged by said first pinion wheel;

an auger for transporting decomposing waste from a back end of the mixing drum to the front end of the mixing drum, the auger being enclosed in an auger tube between a tube inlet opening at a back end of the auger tube and a tube outlet opening at a front end of the auger tube, in fluid communication with said drum outlet opening, the auger tube being disposed inside the mixing drum with the auger extending between said back end of the mixing drum and the front end of the mixing drum; and second drive means for rotating the auger about a longitudinal axis thereof, the second drive means having a second sprocket wheel fixed to the housing for the mixing drum and engaging a second pinion wheel, the second pinion wheel being connected to said auger and driven by said second sprocket wheel during a revolution of the mixing drum, the auger rotating about an axis which is radially spaced from the longitudinal axis for the mixing drum; and the housing further having a finishing drawer disposed inside the housing beneath the front end of the mixing drum and adapted to receive decomposed waste discharged from the drum outlet opening.

7. A composting toilet according to claim 6 in which the first sprocket wheel comprises a toothed track on an outer perimeter of the side wall for the mixing drum and the second sprocket wheel is fixed to the interior of an end wall of the housing for the mixing drum.

8. A composting toilet according to claim 6 in which the first sprocket wheel is located at one end of the mixing drum adjacent said end wall with the second sprocket wheel.

9. A mixing drum according to claim 6 in which the auger tube is disposed inside the mixing drum adjacent to the drum wall with the tube inlet opening oriented inwardly to be adapted to scoop waste from the back end of the mixing drum and the tube outlet opening oriented outwardly to be adapted to discharge decomposed waste through the drum outlet opening.

* * * * *